(12) United States Patent
Hitose et al.

(10) Patent No.: US 8,411,315 B2
(45) Date of Patent: Apr. 2, 2013

(54) INFORMATION PROCESSING DEVICE, INFORMATION PROCESSING METHOD, AND PROGRAM

(75) Inventors: Shingo Hitose, Saitama (JP); Noboru Koyama, Tokyo (JP); Tetsuya Hoshino, Tokyo (JP); Yuma Kokuzawa, Tokyo (JP)

(73) Assignee: Sony Corporation, Tokyo (JP)

( * ) Notice: Subject to any disclaimer, the term of this patent is extended or adjusted under 35 U.S.C. 154(b) by 304 days.

(21) Appl. No.: 12/804,982

(22) Filed: Aug. 3, 2010

(65) Prior Publication Data

US 2011/0043860 A1     Feb. 24, 2011

(30) Foreign Application Priority Data

Aug. 21, 2009   (JP) ................................ P2009-192089

(51) Int. Cl.
*G06F 15/00* (2006.01)
*H04N 5/225* (2006.01)

(52) U.S. Cl. .................................... 358/1.18; 348/207.1

(58) Field of Classification Search ................... 358/1.18
See application file for complete search history.

(56) References Cited

U.S. PATENT DOCUMENTS

| | | | |
|---|---|---|---|
| 6,888,649 B2 * | 5/2005 | Suzuki ............................. | 358/1.9 |
| 2004/0201778 A1 | 10/2004 | Risheq | |
| 2006/0170669 A1 | 8/2006 | Walker et al. | |
| 2008/0062452 A1 | 3/2008 | Silverbrook | |

FOREIGN PATENT DOCUMENTS

JP     2009-045139 A     3/2009

OTHER PUBLICATIONS

European Search Report EP 10172694, dated Feb. 9, 2011.

* cited by examiner

*Primary Examiner* — Saeid Ebrahimi Dehkordy
(74) *Attorney, Agent, or Firm* — Sony Corporation

(57) ABSTRACT

An information processing device includes a printer unit configured to perform a printing process, a display unit configured to display an image and display printing information including setting information of the printing process using the printer unit, a position sensor configured to output a detection signal enabling a determination of whether the information processing device is set in an image display position or a printing position, and a control unit configured to receive the detection signal from the position sensor and display the printing information on the display unit when it is determined that the information processing device is in the printing position.

7 Claims, 8 Drawing Sheets

| | PRINTING INFORMATION | SETTINGS (★ IS DEFAULT) | | |
|---|---|---|---|---|
| (1) | DATE PRINTING | DATE <br> ▭ | DATE/TIME <br> 00:00 | OFF (NO INFORMATION DISPLAYED)★ |
| (2) | PRINTING FINISH | WITH BORDERS 1 <br> 1 | WITH BORDERS 2 <br> 2 | WITHOUT BORDERS (NO INFORMATION DISPLAYED)★ |
| (3) | MULTIPLE COPIES PER SHEET PRINTING | 4 COPIES | 9 COPIES | 16 COPIES |
| (4) | RIBBON CARTRIDGE | SIZE P <br> P | SIZE L <br> L | FOR CLEANING <br> C | NO RIBBON (NO INFORMATION DISPLAYED) |

FIG. 8

INFORMATION PROCESSING DEVICE, INFORMATION PROCESSING METHOD, AND PROGRAM

CROSS-REFERENCE TO RELATED APPLICATION

The present application claims priority from Japanese Patent Application No. JP 2009-192089 filed in the Japanese Patent Office on Aug. 21, 2009, the entire content of which is incorporated herein by reference.

BACKGROUND OF THE INVENTION

1. Field of the Invention

The present invention relates to an information processing device, an information processing method, and a program. More specifically, the present invention relates to an information processing device, an information processing method, and a program to control display of information depending on a mode in which the device is used, in relation to the information processing device combining an image display function and a printing function.

2. Description of the Related Art

There has been widely used a digital photo frame as a photo frame type of a display device for displaying, for example, pictures taken with a digital camera. The digital photo frame, for example, is loaded with a recording medium such as a flash memory that stores an image taken with the digital camera, and displays the image stored in the medium on a display unit including a liquid crystal display (LCD) or the like. A user can use the digital photo frame as a photo frame by selecting a favorite picture from among a large volume of image data stored in the medium and displaying it on the display unit. Such a photo frame is described in, for example, Japanese Unexamined Patent Application Publication No. 2009-45139.

There is also a device configured to be connected to a printer via a universal serial bus (USB) terminal and a USB cable and output the image displayed on the display unit to the printer. Such a device with a printing function receives various settings for printing, command inputs, and the like through a remote control, a touch screen, or an operation switch or an operation button arranged in a space around the display unit.

For use as a photo frame, however, the switch or the button for printing presented on or around the display unit spoils a view disadvantageously causing disfigurement and lowering quality. Even if the operation button for printing can be provided on the back of the display unit, such a configuration is disadvantageous because it is difficult to operate the button when the user wants to print out the image while viewing the image displayed on the display unit.

SUMMARY OF THE INVENTION

It is therefore desirable to provide an information processing device, an information processing method, and a program capable of displaying, for example, setting of the printer and control information only when they are desired, for example, when the printer is used, in relation to the device combining the image display function and the printing function.

According to an embodiment of the present invention, there is provided an information processing device including a printer unit configured to perform a printing process, a display unit configured to display an image and display printing information including setting information of the printing process using the printer unit, a position sensor configured to output a detection signal enabling a determination of whether the information processing device is set in an image display position or a printing position, and a control unit configured to receive the detection signal from the position sensor and display the printing information on the display unit when it is determined that the information processing device is in the printing position.

According to the embodiment of the present invention, the information processing device further includes an operation panel configured to display control icon for the printer unit, wherein the control unit displays the control icon on the operation panel when the control unit receives ready-to-print information indicative of whether the printer unit is ready to print from the printer unit to confirm that the printer unit is ready to print.

According to the embodiment of the present invention, the information processing device further includes a tray sensor configured to detect whether a paper feed tray is attached to the printer unit and an ink ribbon sensor configured to detect whether an ink ribbon is attached to the printer unit, wherein, when the control unit receives detection information from the tray sensor to confirm that the paper feed tray is attached and receives detection information from the ink ribbon sensor to confirm that the ink ribbon is attached, the control unit determines that the printer unit is ready to print and displays the control icon on the operation panel.

According to the embodiment of the present invention, the control icon displayed on the operation panel is a start switch for the printing process performed by the printer unit, and the control unit performs a control to activate a touch sensor function provided to a display area of the control icon on the operation panel when it is determined that the printer unit is ready to print.

According to the embodiment of the present invention, the operation panel is configured with a light emitting diode for displaying the control icon provided under a translucent sheet, and the control unit performs a control to emit a light from the light emitting diode to make the control icon visible on the operation panel when it is determined that the printer unit is ready to print.

According to the embodiment of the present invention, the information processing device can be set in three positions including a landscape mode image display position with the display unit set laterally, a portrait mode image display position with the display unit set longitudinally, and a printing position for performing the printing process using the printer unit, the sensor is a three-dimensional sensor configured to output a detection signal enabling a distinction among at least the three positions, the control unit displays the printing information on the display unit when the control unit receives the detection signal from the three-dimensional sensor and determines that the information processing device is in the printing position, and the control unit does not display the printing information on the display unit when the control unit determines that the information processing device is in the landscape mode image display position or the portrait mode image display position.

According to another embodiment of the present invention, there is provided an information processing method performed by an information processing device including a printer unit and a display unit. The method includes the steps of outputting a detection signal enabling a determination of whether the information processing device is set in an image display position or a printing position from a position sensor, and displaying printing information including setting information of the printing process using the printer unit on the display unit when a control unit receives the detection signal from the position sensor and it is determined that the information processing device is in the printing position.

According to still another embodiment of the present invention, there is provided a program causing an information processing device including a printer unit and a display unit to perform information processing by executing the steps of causing a control unit to receive a detection signal enabling a determination of whether the information processing device is set in an image display position or a printing position from a position sensor, causing the control unit to determine whether the information processing device is in the printing position based on the detection signal from the position sensor, and causing the control unit to display printing information including setting information of the printing process using the printer unit on the display unit when the control unit determines that the information processing device is in the printing position.

The program according to the embodiment of the present invention can be provided to, for example, an image processing device or a computer system capable of executing various program codes in a computer-readable form through a recording medium or a communication medium. By providing such a program in the computer-readable form, a process corresponding to the program can be realized on the image processing device and the computer system.

Further effects, features, and advantages of embodiments of the present invention will become obvious in the embodiments described later and detailed explanations based on the accompanying drawings. It should be noted that a system herein refers to a logical collection of a plurality of devices, and the devices may not be housed in a single chassis.

With a configuration according to an embodiment of the present invention, an information processing device such as a digital photo frame including a printer unit and a display unit can determine whether the information processing device is in the printing position and display printing information on the display unit only at the time of using a printer. Specifically, the information processing device including the photo frame unit and the printer unit distinguishes among three positions including a landscape mode image display position, a portrait mode image display position, and a printing position using a three-dimensional sensor. Only when a control unit determines that the information processing device is in the printing position based on a detection signal from the sensor, the control unit displays printing information including print setting information and the like on the display unit. Furthermore, when it is confirmed that the printer unit is ready to print with a paper feed tray attached thereto and the like, the control unit displays an icon that functions as a switch to start printing on the operation panel. With this configuration, when used as a photo frame, the information processing device can exhibit a simple appearance without displaying the printing information.

DESCRIPTION OF THE PREFERRED EMBODIMENTS

An information processing device, an information processing method, and a program according to embodiments of the present invention will be described in detail below with reference to accompanying drawings in the following order.

1. Outline of information processing device according to an embodiment of the present invention
2. Detail of modes determined by position sensor
3. Example of hardware configuration of information processing device
4. Process sequence performed by information processing device

[1. Outline of Information Processing Device According to an Embodiment of the Present Invention]

Figures 1A, 1B, 1C:
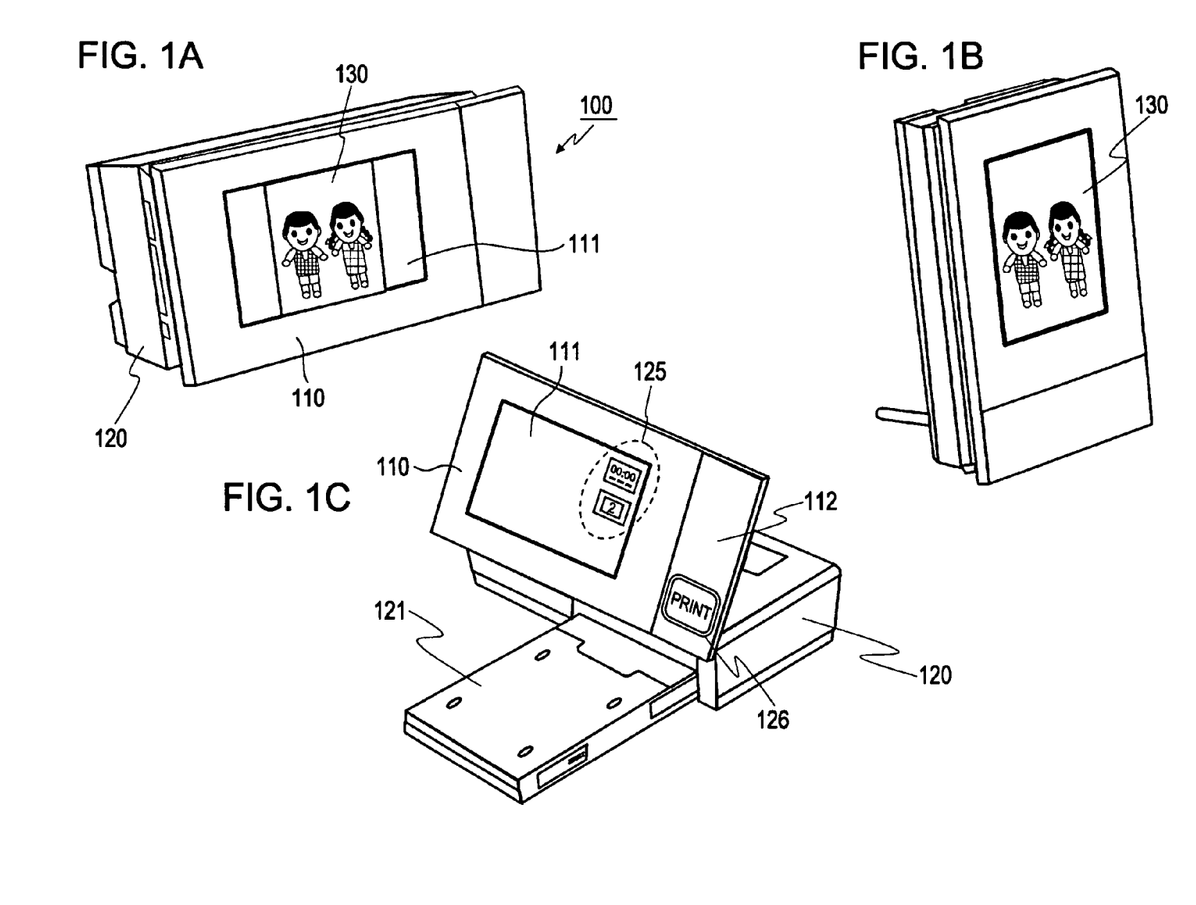
FIGS. 1A to 1C illustrate examples of modes in which an information processing device according to an embodiment of the present invention is used.

First, outline of an information processing device according to an embodiment of the present invention is described with reference to FIGS. 1A to 1C. The information processing device according to the embodiment combines an image display function and a printing function. The information processing device has both functions as a so-called digital photo frame and as a printer. FIGS. 1A to 1C illustrate examples of modes in which an information processing device 100 according to the embodiment is used.

FIGS. 1A to 1C individually illustrate three modes of the information processing device 100. FIGS. 1A and 1B illustrate the information processing device 100 used as the digital photo frame, and FIG. 1C illustrates the information processing device 100 used as the printer.

Respective positions set in the modes illustrated in FIGS. 1A to 1C are defined as below: a landscape mode image display position (see FIG. 1A), a portrait mode image display position (see FIG. 1B), and a printing position (see FIG. 1C).

The landscape mode image display position illustrated in FIG. 1A is suitable for displaying a landscape mode image on a display unit 111.

The portrait mode image display position illustrated in FIG. 1B is suitable for displaying a portrait mode image on the display unit 111.

The printing position illustrated in FIG. 1C is selected to perform a printing process using a printer unit 120.

As illustrated in FIGS. 1A to 1C, the information processing device 100 includes a photo frame unit 110 equipped with the display unit 111 including a liquid crystal display (LCD) and the like and the printer unit 120. The photo frame unit 110 and the printer unit 120 are connected to each other with a hinge provided near a lower end of the information processing unit 100 illustrated in FIG. 1A rotatably with respect to each other. The printing position as illustrated in FIG. 1C is set by rotating the photo frame unit 110.

In image display positions illustrated in FIGS. 1A and 1B, the photo frame unit 110 is closed tightly against the printer unit 120. The image display positions illustrated in FIGS. 1A and 1B are different only in terms of orientation; lateral and longitudinal. The printing position illustrated in FIG. 1C is a state in which the photo frame unit 110 has opened by rotating itself to be detached from the printer unit 120.

The display unit 111 in the photo frame unit 110 displays a display image 130 including an identical portrait mode image in FIGS. 1A and 1B. In both the landscape mode image display position illustrated in FIG. 1A and portrait mode image display position illustrated in FIG. 1B, the display image 130 is displayed in the correct orientation. Control of the image display is performed as a control process using sensor detection information in the information processing device 100.

Based on the sensor detection information, a control unit in the information processing device 100 determines whether the setting is the landscape mode image display position as illustrated in FIG. 1A or the portrait mode image display position as illustrated in FIG. 1B, and changes the display mode of the image. Such image display control is performed in the same manner as with other devices in the past.

One of main features of the information processing device 100 according to the embodiment is a configuration capable of determining not only the landscape mode image display position as illustrated in FIG. 1A and the portrait mode image display position as illustrated in FIG. 1B but also the printing position as illustrated in FIG. 1C.

The information processing device 100 according to the embodiment includes a position sensor such as a three-dimensional sensor capable of determining in which one of the following three positions the information processing device 100 is set: the landscape mode image display position, the portrait mode image display position, and the printing position.

Based on the detection information from the three-dimensional sensor, the information processing device 100 determines in which one of the positions illustrated in FIGS. 1A to 1C the information processing device 100 is set. When it is determined that the information processing device 100 is set in the printing position, the information processing device 100 displays printing information 125 including an icon indicative of control information and setting information of the printer unit 120 on the display unit 111 as illustrated in FIG. 1C.

Furthermore, when it is confirmed that the information processing device 100 is in the printing position and that the information processing device 100 is ready to start printing loaded with a paper feed tray 121, an ink ribbon, and the like, the information processing device 100 displays a printer icon 126 including a printer operation switch and the like on an operation panel 112 formed at the right of the photo frame unit 110.

A surface of the operation panel 112 is formed with, for example, a translucent sheet. When it is confirmed that the information processing device 100 is in the printing position and that the information processing device 100 is ready to start printing loaded with the paper feed tray 121 and the like, the control unit of the information processing device 100 turns on a light emitting diode (LED) provided under the sheet. As a result, an icon that serves as an operation switch showing letters of [PRINT] as illustrated in FIG. 1C is set in a visible state.

In a state where the information processing device 100 is set in the landscape mode image display position as illustrated in FIG. 1A or the portrait mode image display position as illustrated in FIG. 1B, both the printing information 125 and the printer icon 126 illustrated in FIG. 1C are hidden.

Accordingly, when the information processing device 100 is set in the landscape mode image display position as illustrated in FIG. 1A or the portrait mode image display position as illustrated in FIG. 1B, the display unit 111 displays the display image 130 alone, which can be used as a photo frame with a simple appearance.

When the information processing device 100 according to the embodiment of the present invention is used as a printer, the information processing device 100 is set in the printing position illustrated in FIG. 1C and loaded with the paper feed tray 121. A procedure for performing a printing process is explained below with reference to FIGS. 2A and 2B.

Figures 2A, 2B:
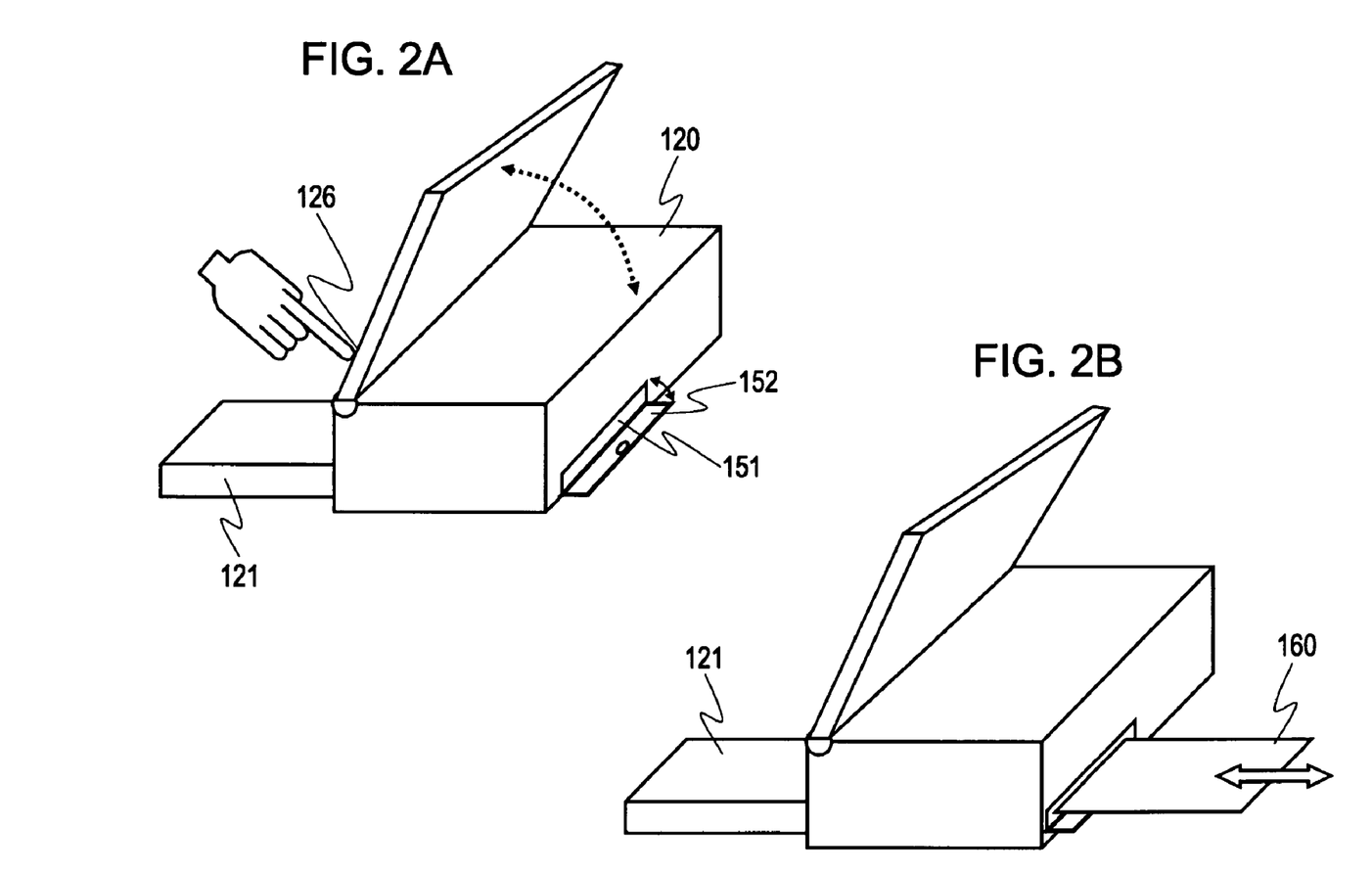
FIGS. 2A and 2B illustrate an example of processing when the information processing device according to the embodiment is used as a printer.

When used as a printer, the information processing device 100 is set in the printing position as illustrated in FIG. 1C and loaded with the paper feed tray 121 as illustrated in FIG. 2A. A user then touches or presses down the printer icon 126 showing the letters of [PRINT] illustrated in FIG. 1C, thereby starting printing. The surface of the printer icon 126 illustrated in FIG. 1C is configured as a touch sensor that detects a contact with the user's finger. The detection information is input to the control unit in the information processing device 100, and the printer unit 120 starts an operation under control of the control unit. An activation process of the touch sensor is also performed in synchronization with the display process of the printer icon 126. Therefore, in the state where the information processing device 100 is set in the landscape mode image display position as illustrated in FIG. 1A or the portrait mode image display position as illustrated in FIG. 1B, the printer does not start its operation even if the user touches the location on the printer icon 126.

As illustrated in FIG. 2A, a paper port 151 for feeding and discharging a printing paper is provided on the back side of the printer unit 120. An opening and closing flapper 152 is configured to rotatably open in the printing position.

At the time of execution of printing, as illustrated in FIG. 2B, a printing paper 160 repeats entering and exiting the paper port 151 on the back side of the printer unit 120, thereby performing the printing process. For example, the printing process is performed in each color of yellow, magenta, and cyan. The printing paper 160 enters and exits the printer unit 120 through the paper port 151 in the printing process of each color and, when the process is completed in all colors, the printing paper 160 with a color print thereon is discharged.

As described above, the information processing device 100 according to the embodiment includes the three-dimensional sensor to determine the positions illustrated in FIGS. 1A to 1C based on the detection information from the three-dimensional sensor. That is, the information processing device 100 determines in which one of the following three positions the information processing device 100 is set: the landscape mode image display position, the portrait mode image display position, and the printing position.

[2. Detail of Modes Determined by Position Sensor]

Detail of a position determination process using a position sensor, specifically, the three-dimensional sensor, for example, is explained below with reference to FIGS. 3A to 3C and FIGS. 4A to 4C. Each of FIGS. 3A to 3C includes a part (A), a part (B), and a part (C) that are a front view, a top view, and a side view, respectively, of the three positions illustrated in FIGS. 1A to 1C.

Figure 3A:
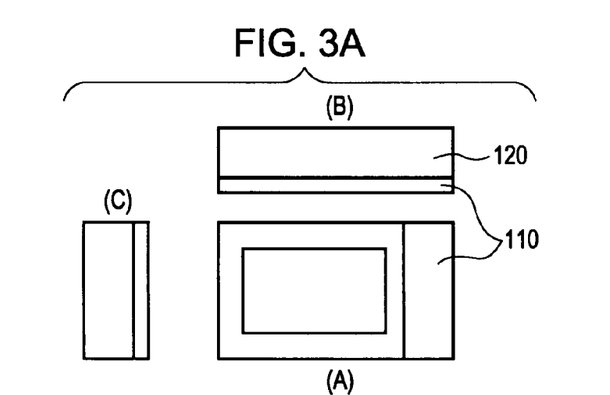
FIGS. 3A to 3C illustrate positions of the information processing device according to the embodiment that correspond to the respective modes.

FIG. 3A illustrates the landscape mode image display position in FIG. 1A and the part (A) is the front view in which the photo frame unit 110 is set landscape. As illustrated in the part (B) of the top view and the part (C) of the side view, the photo frame unit 110 is in close contact with the printer unit 120.

Figure 3B:
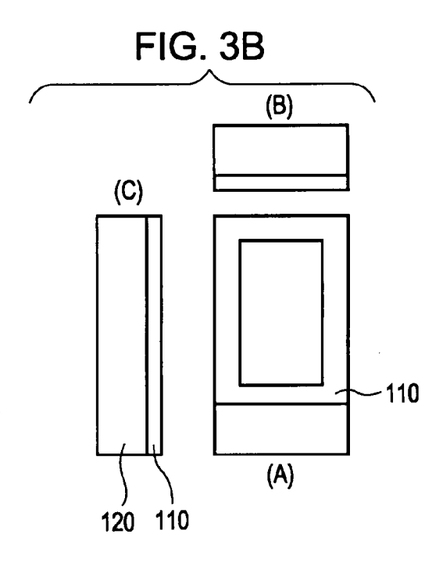

FIG. 3B illustrates the portrait mode image display position in FIG. 1B and the part (A) is the front view in which the photo frame unit 110 is set portrait. As illustrated in the part (B) of the top view and the part (C) of the side view, the photo frame unit 110 is in close contact with the printer unit 120.

Figure 3C:
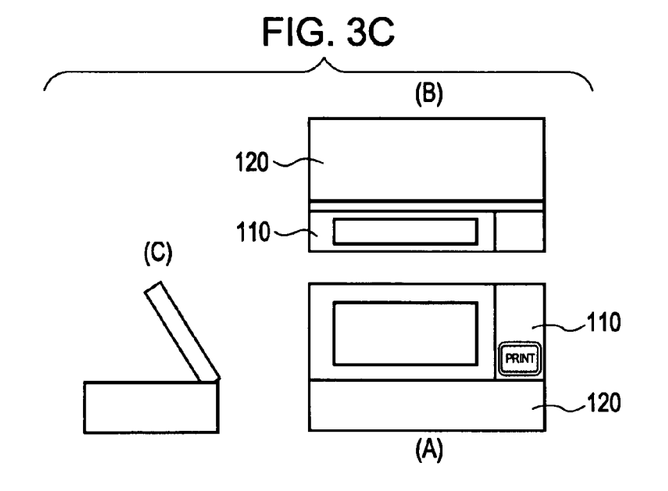

FIG. 3C illustrates the printing position in FIG. 1C and the part (A) is the front view in which the photo frame unit 110 is set laterally on top of the printer unit 120. As illustrated in the part (B) of the top view and the part (C) of the side view, the photo frame unit 110 is detached from the printer unit 120.

The position sensor (three-dimensional sensor) provided in the information processing device 100 is set inside the printer unit 120, and determines in which one of the three positions including the landscape mode image display position in FIG. 1A, the portrait mode image display position in FIG. 1B, and the printing position in FIG. 1C the information processing device 100 is set based on an arrangement of the printer unit 120.

Figure 4A:
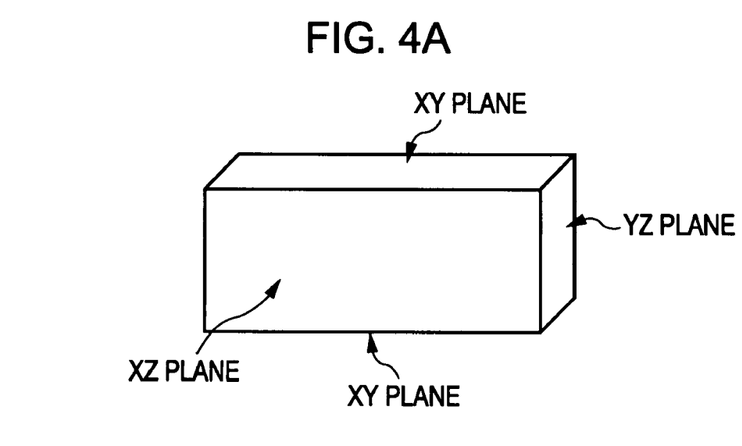
FIGS. 4A to 4C illustrate positions of a printer unit in respective modes of the information processing device according to the embodiment.
Figure 4B:
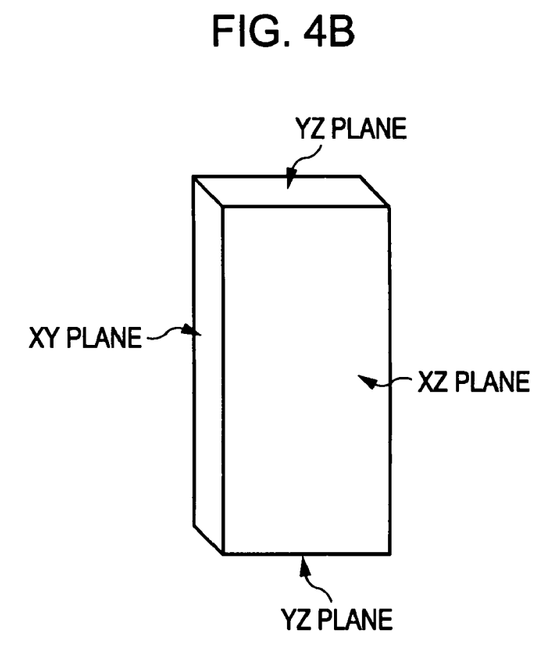
Figure 4C:
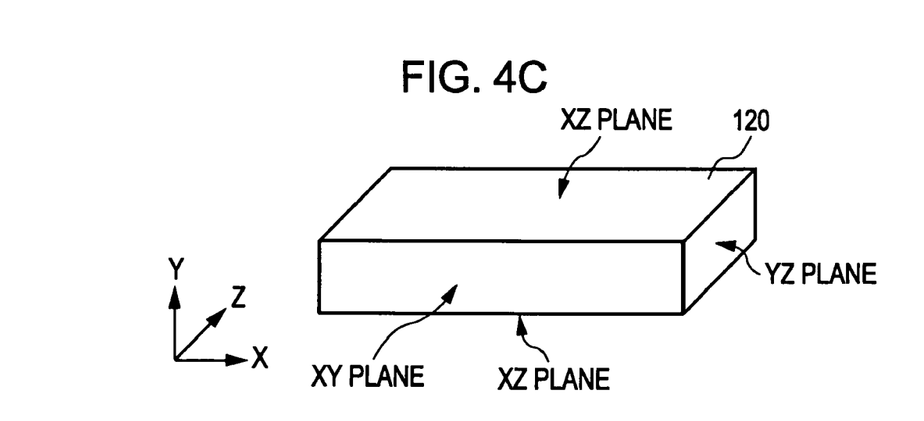

FIGS. 4A to 4C comprehensively illustrate the arrangement of the printer unit 120 in the above-described three positions illustrated in FIGS. 1A to 1C, respectively.

FIG. 4C illustrates the printing position in FIG. 1C, and it is assumed that the horizontal direction (from left to right) is an X direction, the vertical direction (from bottom to top) is a Y direction, and the depth direction is a Z direction.

On this assumption, an XY plane is the front face, and an XZ plane is the bottom face in the printing position in FIG. 4C.

FIGS. 4A and 4B illustrate the other positions in FIGS. 1A and 1B, and the following arrangements are employed.

FIG. 4A illustrates the landscape mode image display position in FIG. 1A, and the XZ plane is the front face and the XY plane is the bottom face.

FIG. 4B illustrates the portrait mode image display position in FIG. 1B, and the XZ plane is the front face and an YZ plane is the bottom face.

As described above, the position of the printer unit 120 varies among the three positions. Therefore, by providing the three-dimensional sensor inside the printer unit 120, it can be determined in which one of the three positions the information processing device 100 is set. The three positions are: the landscape mode image display position, the portrait mode image display position, and the printing position as illustrated in FIGS. 4A to 4C, respectively.

The position sensor provided inside the printer unit 120 may be configured in any way as long as the three positions illustrated in FIGS. 4A to 4C can be distinguished from one another. Therefore, for example, it may be a combination of two double-axis tilt sensors.

Specifically, the position sensor may be a sensor configured by combining a double-axis tilt sensor to distinguish between the two positions illustrated in FIGS. 4A and 4B (which one of the XY plane and the YZ plane is set as the bottom face) and another double-axis tilt sensor to distinguish between the two positions illustrated in FIGS. 4A and 4C (which one of the XY plane and the XZ plane is set as the bottom face).

[3. Example of Hardware Configuration of Information Processing Device]

Figure 5:
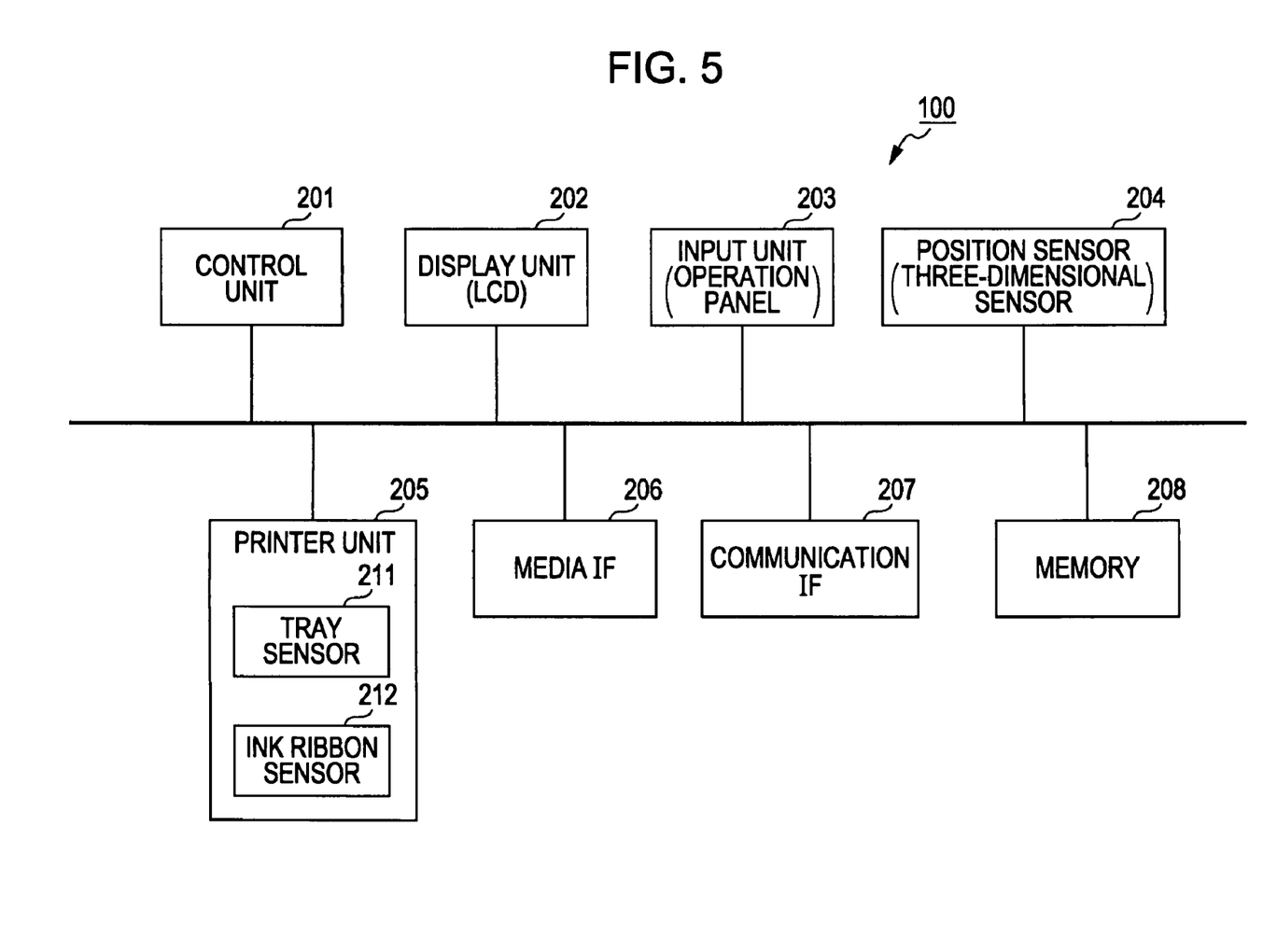
FIG. 5 illustrates an example of a hardware configuration of the information processing device according to the embodiment.

Next, an example of a hardware configuration of the information processing device 100 according to the embodiment of the present invention is described with reference to FIG. 5. As illustrated in FIG. 5, the information processing device 100 includes a control unit 201, a display unit 202, an input unit 203, a position sensor (three-dimensional sensor) 204, a printer unit 205, a media interface (IF) 206, a communication IF 207, and a memory 208.

The control unit 201 controls processes performed by the information processing device 100 including image display control on the display unit 202, control of the printing process performed by the printer unit 205, and display control of the icon and the operation switch based on the detection information from the position sensor (three-dimensional sensor) 204. The control unit 201 includes, for example, a central processing unit (CPU) having a function of executing a program. The program executed by the control unit 201 is stored in, for example, the memory 208.

The display unit 202 includes, for example, a liquid crystal display (LCD), and corresponds to the display unit 111 described with reference to FIGS. 1A to 1C. The display unit 202 displays, for example, an image stored in the memory 208 and an image stored in a flash memory attached to the media IF 206. The display unit 202 further displays the printing information 125 described above with reference to FIG. 1C.

The input unit 203 corresponds to the operation panel 112 described with reference to FIG. 1C. The operation panel used as the input unit 203 is used as a display area of the printer icon 126 (see FIG. 1C) which becomes visible only when the information processing device 100 is set in the printing position and also set in a printable state by loading the paper feed tray and the like as described above. The operation panel used as the input unit 203 also has a touch sensor function, and the printing process is initiated by the user's finger touching the operation panel.

The operation panel used as the input unit 203 includes, for example, a light-emission controlled LED under a translucent sheet, and the printer icon 126 as illustrated in FIG. 1C becomes visible by the light emitted from the LED.

When the control unit 201 confirms that the printing position is set and that the information processing device 100 is in the printable state based on the detection information from the position sensor (three-dimensional sensor) 204, the control unit 201 turns on the LED as a print button on the operation panel used as the input unit 203 and performs an activation process of activating the touch sensor. After this process, the user can operate the print button to start printing.

The position sensor (three-dimensional sensor) 204 generates a detection signal to determine in which one of the following three positions described above with reference to FIGS. 1A to 4C the information processing device 100 is set, and supplies the detection signal to the control unit 201. The three positions are the landscape mode image display position, the portrait mode image display position, and the printing position.

The position sensor (three-dimensional sensor) 204 is fixed to the printer unit 205 and outputs the signal enabling the distinction among the three positions described above with reference to FIGS. 4A to 4C to the control unit 201.

The control unit 201 performs control of the display image on the display unit 202 as well as the display control of the printing information including the icon and the operation switch, printer control information, and printer setting information on the display unit 202 and the input unit (operation panel) 203 based on the detection information from the position sensor (three-dimensional sensor) 204.

The printer unit 205 performs the printing process.

The printer unit 205 includes a tray sensor 211 and an ink ribbon sensor 212. The tray sensor 211 detects whether the printer unit 205 is loaded with the paper feed tray. The ink ribbon sensor 212 detects whether the printer unit 205 is loaded with the ink ribbon. The detection information from them is supplied to the control unit 201. The control unit 201 performs the display control of the printer control information and the printer setting information on the input unit (operation panel) 203 based on the detection information.

The media IF 206 is loaded with a recording medium such as the flash memory recorded with an image taken with the digital camera. The recorded image in the loaded recording medium is read and displayed on the display unit 202 under the control of the control unit 201.

The communication IF 207 includes a connection unit to be connected to an external device, such as a universal serial bus (USB) terminal, and a reception unit to receive an output signal from a remote control. The communication IF 207 is connected to the external device such as a personal computer and a printer with a USB cable connected to the USB terminal, thereby inputs and outputs data.

The communication IF 207 also receives an operation signal from the remote control that comes with the information processing device 100. The received signal is input to the control unit 201, and the setting of the printer unit 205 is changed and the change process of the display on the display unit 202 is performed under the control of the control unit 201.

The memory 208 includes a random access memory (RAM), read only memory (ROM), or the like, and it is used as a work area for storing the program executed by the control unit 201 and executing the program. The memory 208 is also used as a memory area for storing the display image displayed on the display unit 202 and a memory area for storing parameters and the like used for the process performed by the control unit 201.

[4. Process Sequence Performed by Information Processing Device]

Figure 6:
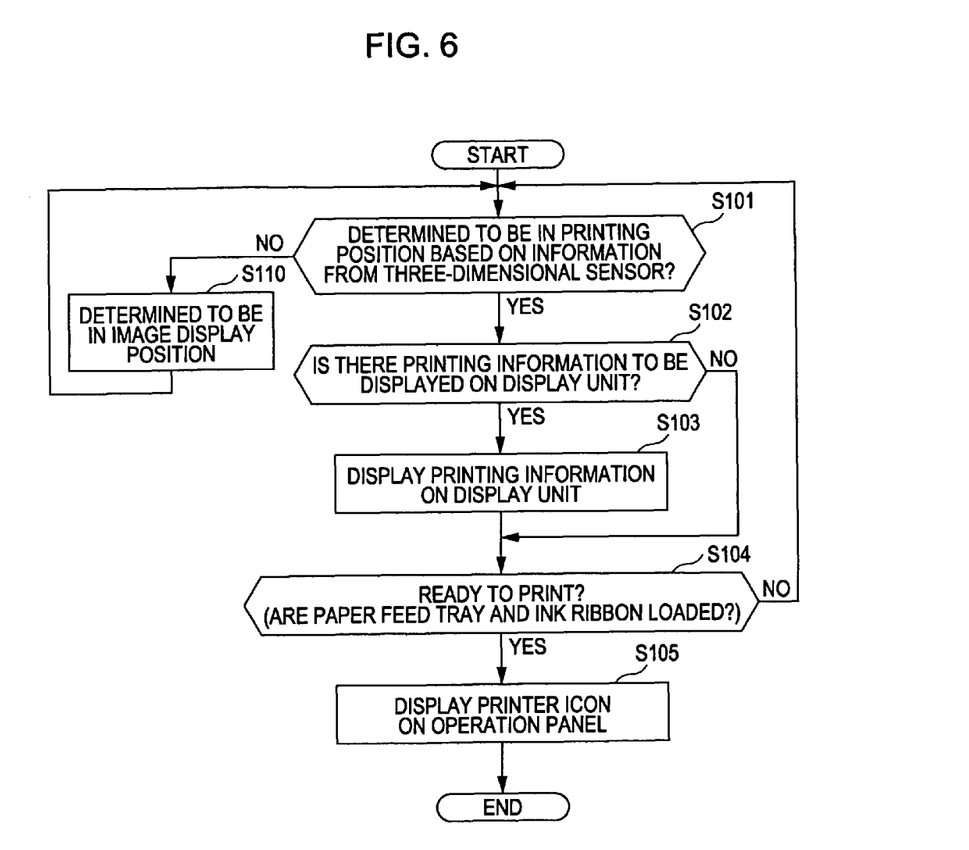
FIG. 6 is a flowchart of a process sequence performed by the information processing device according to the embodiment.

A process sequence performed by the information processing device according to the embodiment of the present invention is explained below with reference to a flowchart illustrated in FIG. 6. The process illustrated in FIG. 6 is performed under the control of the control unit 201 of the information processing device.

At Step S101, the control unit 201 inputs the detection information from the position sensor (three-dimensional sensor) 204, and determines whether the information processing device is set in the printing position (see FIG. 1C). As described above, the position sensor (three-dimensional sensor) 204 is fixed to the printer unit, and outputs the signal enabling distinction among the three positions described above with reference to FIGS. 4A to 4C to the control unit 201.

The control unit 201 determines whether the information processing device is set in the printing position (see FIG. 1C) based on the detection information from the position sensor (three-dimensional sensor) 204. When it is determined that the information processing device is set in the printing position (see FIG. 1C), the process moves to Step S102. When it is determined that the information processing device is not set in the printing position (see FIG. 1C), the process moves to Step S110.

At Step S110, it is determined that the information processing device is set in the image display position (see FIGS. 1A and 1B). In this case, it is determined in which one of the landscape mode image display position illustrated in FIG. 1A and the portrait mode image display position illustrated in FIG. 1B the information processing device is set, and the process of controlling the orientation of the display image on the display unit is performed depending on the determination result. This process is performed with the related technology, and an explanation thereof is omitted.

When it is determined that the information processing device is set in the printing position (see FIG. 1C) at Step S101, the process moves to Step S102 and it is determined whether there is any printing information to be displayed on the display unit.

When it is determined that there is any printing information to be displayed on the display unit, the process moves to Step S103, and the printing information is displayed on the display unit. When it is determined that there is not any printing information to be displayed on the display unit, the process moves to Step S104 skipping Step S103.

Figure 7:
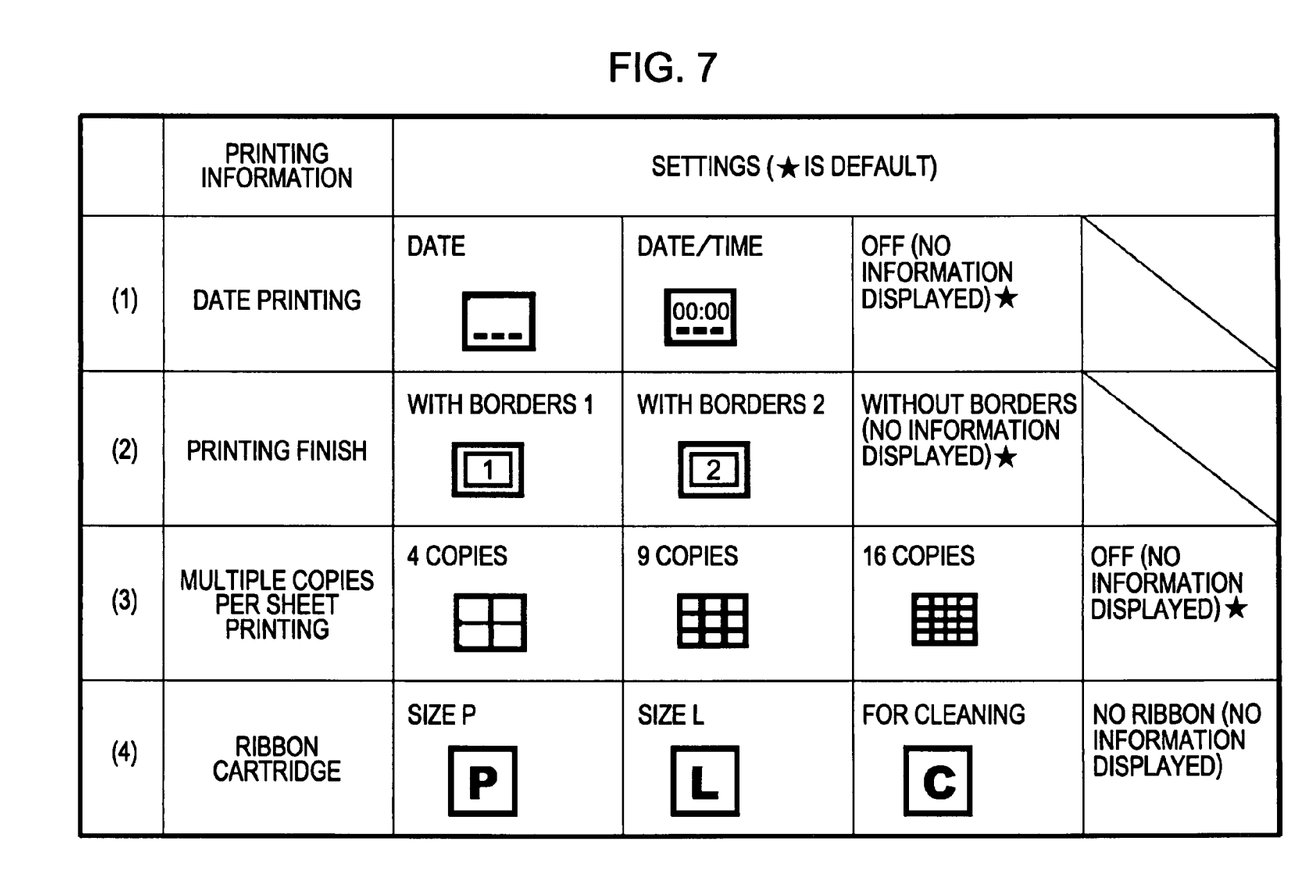
FIG. 7 illustrates an example of printing information displayed on a display unit of the information processing device according to the embodiment.

An example of the printing information displayed on the display unit is described below with reference to FIG. 7. The printing information includes an icon and the like indicative of print setting information, control information, and the like to be displayed on the display unit at the time of the printing process using the printer unit. As illustrated in FIG. 7, the printing information includes, for example, the following information: (1) setting information for date printing; (2) setting information for printing finish; (3) setting information for multiple copies per sheet printing; and (4) setting information about ribbon cartridge.

The information illustrated in FIG. 7 is merely an example, and other information can be used as well.

The setting information for date printing (1) indicates whether the image should be printed with the date, the date and time, or neither of the date and time. There are icons of the date alone and the date and time, and the corresponding icon is displayed on the display unit as the printing information when either setting is selected. When neither is selected, the printing information is not displayed.

The setting information for printing finish (2) indicates the mode of borders to be set for a printed image. In this example, the setting can be selected from two types of borders (with borders 1 and 2), and the corresponding icon is displayed on the display unit as the printing information when either border setting is selected. When neither is selected, the printing information is not displayed.

The setting information for multiple copies per sheet printing (3) indicates the number of copies to be printed on a single sheet. In this example, the setting can be selected from among three modes (four, nine, and sixteen copies per sheet), and the corresponding icon is displayed on the display unit as the printing information when any setting is selected. When none is selected, the printing information is not displayed.

The setting information about ribbon cartridge (4) indicates the type of the ribbon cartridge loaded to the printer unit. When a cartridge with size P, with size L, or for cleaning is loaded, the corresponding icon is displayed on the display unit as the printing information. When none is selected, the printing information is not displayed.

Figure 8:
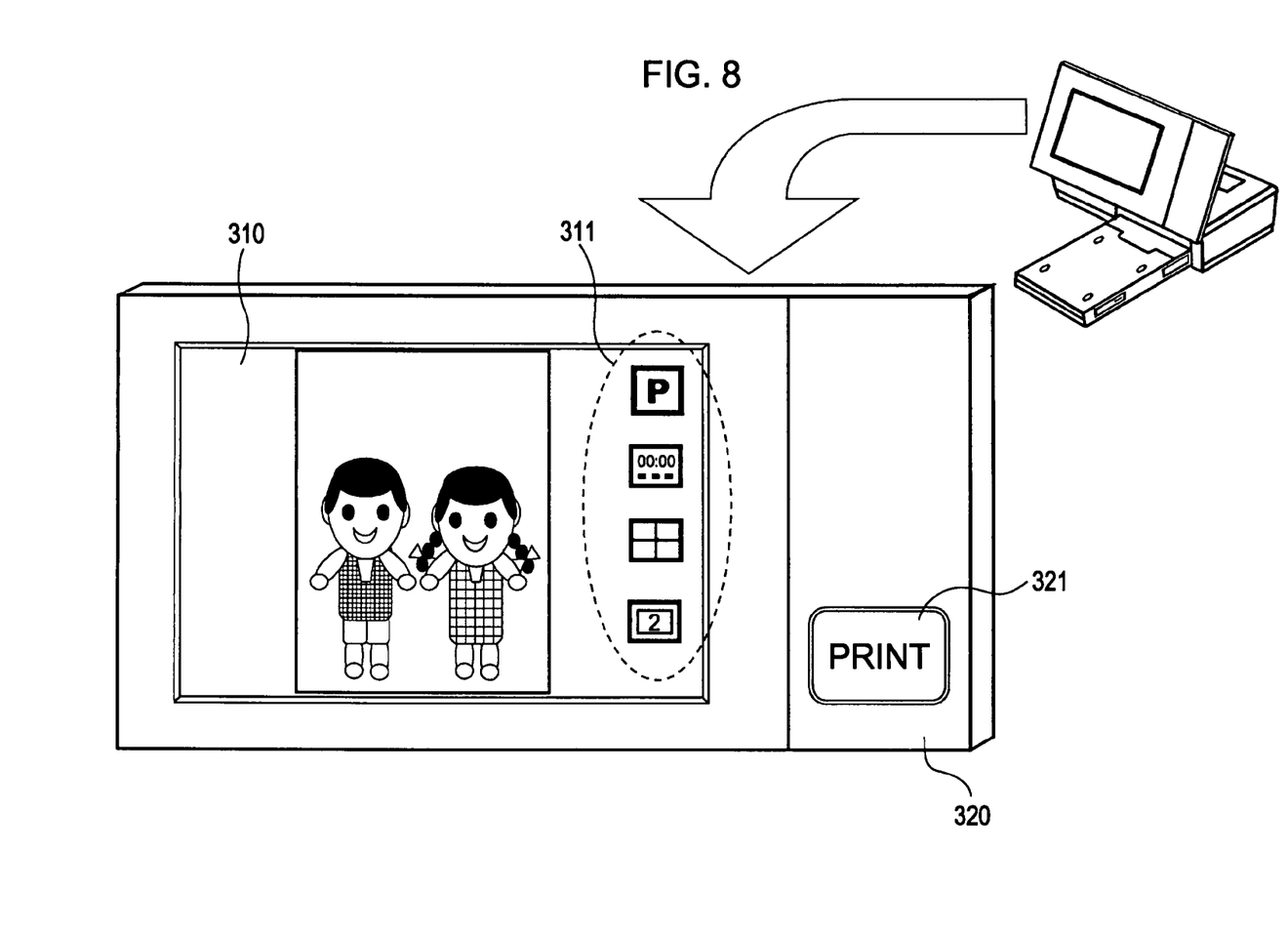
FIG. 8 illustrates an example of the printing information displayed on the display unit and a printer icon displayed on an operation panel of the information processing device according to the embodiment.

As described above, various types of icons illustrated in FIG. 7 are displayed on the display unit as the printing information depending on the setting. FIG. 8 illustrates an example of the display. As illustrated in FIG. 8, printing information 311 including icons corresponding to the printer setting is displayed on a display unit 310.

The example illustrated in FIG. 8 is the display in a case where it is determined that there is the printing information to be displayed on the display unit at Step S102 in the flowchart illustrated in FIG. 6 and where the printing information is displayed on the display unit at Step S103.

A case where it is determined that there is not any printing information to be displayed on the display unit at Step S102 is, for example, when all of the settings (1) to (4) include no information to be displayed, i.e., when they all are set to the rightmost item on the chart illustrated in FIG. 7. In such a case, the process skips Step S103 and moves to Step S104.

After the printing information is displayed on the display unit at Step S103 or when the process moves to Step S104 skipping Step S103, it is determined whether a preparation for printing is complete at Step S104. Specifically, it is determined whether the paper feed tray is set and the ink ribbon is loaded to the printer unit. The determination is made by the control unit 201 receiving the detection results from the tray sensor 211 and the ink ribbon sensor 212 illustrated in FIG. 5.

When it is confirmed that the paper feed tray is set and the ink ribbon is loaded and it is determined that the printing preparation is complete at Step S104, the determination result at Step S104 is YES and the process moves to Step S105. When it is not determined that the printing preparation is complete at Step S104, the determination result at Step S104 is NO and the process returns to Step S101 to repeat the process from Step S101.

When the printing preparation is complete and the determination result is YES at Step S104, the process moves to Step S105. At Step S105, the printer icon is displayed on the operation panel. This process is explained below with reference to FIG. 8.

As illustrated in FIG. 8, a printer icon 321 is displayed on an operation panel (input unit) 320. The process of displaying the printer icon 321 is performed by, for example, turning on the LED provided under the translucent display panel (input unit) 320. The printer icon 321 is used as a start switch for starting the printing process. When the user touches the location on the printer icon 321, a touch sensor or a switch in the location of the printer icon 321 transmits the operation information to the control unit, and the control unit starts the operation of the printer unit. The printing process is triggered by this process.

As described earlier, the printer icon 321 illustrated in FIG. 8 is not visible unless the light is emitted, where no information is displayed on the operation panel (input unit) 320. Furthermore, though the display panel (input unit) 320 has the touch sensor function, the touch sensor function is activated by the control unit 201 to operate as a touch sensor when the determination result is YES at Step S104, i.e., when it is confirmed that the paper feed tray is set and the ink ribbon is loaded to the printer unit, thereby confirming that the printing preparation is made.

As described above, the information processing device according to the embodiment of the present invention determines in which one of the following positions the information processing device is set based on the detection result from the three-dimensional sensor. The positions are the landscape mode image display position, the portrait mode image display position, and the printing position, as illustrated in FIGS. 1A to 1C, respectively.

When it is determined that the information processing device is set in the printing position as illustrated in FIG. 1C, as illustrated in FIG. 1C and FIG. 8, the information processing device displays the printing information including the icon indicative of the control information and the setting information of the printer unit on the display unit.

Furthermore, when it is confirmed that the information processing device is in the printing position and that the information processing device is ready to start printing loaded with the paper feed tray and the ink ribbon, the information processing device displays the printer icon including the printer operation switch and the like on the operation panel formed at the right of the photo frame unit.

In a state where the information processing device is set in the landscape mode image display position illustrated in FIG. 1A or the portrait mode image display position illustrated in FIG. 1B, the printing information is not displayed on the display unit and the printer icon is not displayed on the operation panel. Accordingly, when the information processing device is set in the landscape mode image display position or the portrait mode image display position, the information processing device can be used as a photo frame with a simple appearance.

Moreover, when the information processing device is set in the printing position, because various types of the printing information are displayed on the display unit including the print setting information, the user can recognize the setting information of the printer and change the setting using a remote control or the like, if desired.

Furthermore, the icon that serves as a print start switch is displayed on the operation panel only when the information processing device is ready to start printing loaded with the paper feed tray and the ink ribbon, and the user can start printing by operating on the icon serving as the print start switch without question.

Embodiments of the present invention are detailed above with reference to specific examples. However, it is obvious that those skilled in the art can make modifications and alterations of the embodiments without departing from the scope of the embodiments of the present invention. That is, the embodiments of the present invention are disclosed as examples and should not be limited to the embodiments. To understand the scope of the embodiments of the present invention, appended claims should be considered.

A series of the process described herein can be performed by hardware, software, or a combination of both. To perform the process using the software, a program including the process sequence is installed in a memory in a computer integrated in an exclusive hardware to be executed, or the program is installed in a general-purpose computer capable of executing various processes to be executed. For example, the program can be recorded in a recording medium in advance. In addition to installation from the recording medium to the computer, the program can be received through a network such as a local area network (LAN) and the Internet, and installed to a recording medium such as a built-in hard disk.

Various processes described herein may be performed not only in the temporal order as described but also in parallel or independently depending on the processing capacity of the device that performs the process or as desired. The term "system" herein means a logical collection of a plurality of devices, and the devices may not be housed in a single chassis.

What is claimed is:

1. An information processing device comprising:
    a printer unit operable to perform a printing process;
    a display unit operable to display an image and display printing information, wherein the printing information comprises setting information of the printing process using the printer unit;
    a position sensor operable to output a detection signal enabling a determination of whether the information processing device is set in an image display position or a printing position; and
    a control unit operable to receive the detection signal from the position sensor and display the printing information on the display unit when it is determined that the information processing device is in the printing position.

2. An information processing method performed by an information processing device including a printer unit and a display unit, the method comprising the steps of:
    obtaining a detection signal from a position sensor;

determining whether the information processing device is set in an image display position or a printing position based on the detection signal; and displaying printing information including setting information of the printing process using the printer unit or an image on the display unit, wherein the printing information is displayed when a control unit receives the detection signal from the position sensor and it is determined that the information processing device is in the printing position.

3. A non-transitory computer-readable-medium storing a computer program causing an information processing device including a printer unit and a display unit to perform information processing by executing the steps of:

receiving a detection signal from a position sensor;

determining whether the information processing device is in a printing position or a landscape mode image display position or a portrait mode image display position based on the detection signal from the position sensor;

displaying an image on the display unit when it is determined that the information processing device is in a landscape mode image display position or a portrait mode image display position; and displaying printing information including setting information of the printing process on the display unit when it is determined that the information processing device is in the printing position.

4. An information processing device comprising:

a printer unit operable to perform a printing process;

a display unit operable to display an image and display printing information, wherein the printing information comprises setting information of the printing process using the printer unit;

a position sensor operable to output a detection signal enabling determination of whether the information processing device is set in an image display position or a printing position;

a control unit operable to receive the detection signal from the position sensor and display the printing information on the display unit when it is determined that the information processing device is in the printing position;

an operation panel operable to display a control icon for the printer unit;

a tray sensor operable to detect whether a paper feed tray is attached to the printer unit; and an ink ribbon sensor operable to detect whether an ink ribbon is attached to the printer unit, wherein the control unit displays the control icon on the operation panel when the control unit receives ready-to-print information from the printer unit indicative of whether the printer unit is ready to print, wherein when the control unit receives detection information from the tray sensor to confirm that the paper feed tray is attached and receives detection information from the ink ribbon sensor to confirm that the ink ribbon is attached, the control unit determines that the printer unit is ready to print and displays the control icon on the operation panel.

5. The information processing device according to claim 4, wherein the control icon displayed on the operation panel is a start switch for the printing process performed by the printer unit, and wherein the control unit activates a touch sensor function provided to a display area of the control icon on the operation panel when it is determined that the printer unit is ready to print.

6. The information processing device according to claim 4, wherein the operation panel is comprises a light emitting diode provided under a translucent sheet, and wherein the control unit controls light emitted from the light emitting diode to make the control icon visible on the operation panel when it is determined that the printer unit is ready to print.

7. The information processing device according to claim 4, wherein the information processing device can be set in three positions including a landscape mode image display position with the display unit set laterally, a portrait mode image display position with the display unit set longitudinally, and a printing position for performing the printing process using the printer unit, wherein the position sensor is a three-dimensional sensor operable to output the detection signal enabling a distinction among at least the three positions, wherein the control unit displays the printing information on the display unit when the control unit receives the detection signal from the three-dimensional sensor and determines that the information processing device is in the printing position, and wherein the control unit does not display the printing information on the display unit when the control unit receives the detection signal from the three-dimensional sensor and determines that the information processing device is in the landscape mode image display position or the portrait mode image display position.

* * * * *